United States Patent
Caplette

Patent Number: 6,047,500
Date of Patent: Apr. 11, 2000

[54] WINDOW SHIELD

[75] Inventor: Geoffrey K. Caplette, Altadena, Calif.

[73] Assignee: Transmatic, Inc., Waterford, Mich.

[21] Appl. No.: 09/063,105

[22] Filed: Apr. 20, 1998

[51] Int. Cl.[7] .................................................. E06B 7/18
[52] U.S. Cl. .................................. 49/466; 49/62; 49/57; 52/203
[58] Field of Search ............................... 49/466, 463, 62, 49/61, 57, 55; 52/202, 203, 204.53, 204.54, 204.6, 204.64

[56] References Cited

U.S. PATENT DOCUMENTS

| | | | |
|---|---|---|---|
| 3,815,284 | 6/1974 | Schubach | 49/466 |
| 4,320,609 | 3/1982 | Abell | 52/202 |
| 4,768,319 | 9/1988 | Derner | 49/466 X |
| 5,242,207 | 9/1993 | Carson et al. | 296/146.15 |
| 5,467,557 | 11/1995 | Jones | 49/506 X |
| 5,809,707 | 9/1998 | Bargados et al. | 49/463 X |

Primary Examiner—Daniel P. Stodola
Assistant Examiner—Hugh B. Thompson
Attorney, Agent, or Firm—Christie, Parker & Hale, LLP

[57] ABSTRACT

A mounting bracket and window shield assembly for protecting a window of the type found on a subway or bus includes a shield made of a flexible sheet of plastic. The shield is held in place by a mounting bracket which mounts directly to the existing window and window frame on the four sides of the window. The mounting bracket has a T-shaped cross section in which a first arm of the T forms a tab that is inserted between the existing window and window frame. The second arm of the T and the body of the T together form a seat upon which the window shield is placed. The window shield is held in place against the seat of the mounting bracket by a length of an elastomeric retaining seal. The retaining seal includes a bead which permits the retaining seal to be removably anchored to a channel formed by the body of the mounting bracket.

23 Claims, 1 Drawing Sheet

WINDOW SHIELD

FIELD OF THE INVENTION

The present invention is directed to a window protector for use in protecting the windows of public transportation vehicles such as subways or buses. More particularly, it discloses a window protector comprising a window shield and mounting bracket that can easily be installed on an existing window. Once the mounting bracket and window shield are installed, a damaged window shield can easily be replaced with minimal downtime for the vehicle.

BACKGROUND OF THE INVENTION

Graffiti on windows in public areas has been a longstanding problem, particularly for windows on public transportation systems, such as subways and buses. One solution to the problem of graffiti on windows has been the mounting of transparent shields or guard panels on the windows. When such a device is installed, graffiti collects on the shield rather than the window. These graffiti shields are typically plastic and disposable. The windows themselves are often much more expensive to replace than a disposable plastic graffiti shield. When an undesirable amount of graffiti is present on the shield, the shield can be removed, disposed of and replaced without replacing the window.

There have been various approaches to mounting the graffiti shields over the windows. One solution has been to use retaining strips which hold the graffiti shield over the window by clamping the edge of the shield between the strips and the window or the frame. The retaining strips are generally held to the frame with fasteners such as screws. By tightening the screws, the strips hold the graffiti shield in place. Another solution has been to use double-sided tape. The tape is applied directly to the face of the graffiti shield and then the shield is attached to the window or to the frame. Still another approach has been to install a new window frame that will hold both the graffiti shield and the window in place.

Each of these solutions to the problem of mounting the graffiti shield over the window have significant disadvantages. Using retaining strips held in place by screws is inefficient because the initial installation of the strips is difficult and expensive. In addition, replacing the graffiti shield is time consuming, as at least one of the strips must be completely removed by unscrewing the screws one by one. Moreover, after the graffiti shields have been replaced a number of times, the threads on the retaining strips or the mounting for the retaining strips can become worn and eventually stripped. This can require the frequent replacement of the strips and eventually the mounting for the strips as well.

The use of double-sided tape has some advantages in that the installation replacement and maintenance can be simplified. However, the graffiti shield panel itself or such a system is generally more expensive than the simple panel which can be used with the retaining strips. Another drawback to the use of double-sided tape is that the removal of such tapes often leaves a residue behind which can be difficult and time consuming to remove.

The use of a window frame that holds both the window and the graffiti shield permits the rapid replacement of a graffiti shield, but initial installation is costly and time consuming.

Also, there are installation difficulties inherent in a dual glaze bus window system. The largest single problem is moisture intrusion between the two glazing plies. If there is an insufficient gap between the two plies, the water and/or moisture that may get in between the plies due to washing or normal condensation processes, may not drain properly. If this should occur and the trapped water cannot drain out properly, visibility through the window can be impaired. Furthermore, water buildup can lead to the formation of salt or calcium deposits between the window and the window shield which can further impair the clarity of both the window and the window shield.

Another problem typical in a dual glaze bus window system is that the graffiti shield is generally made of a relatively soft material, such as acrylic. If that material comes into contact with the structural glazing, such contact can create clouding or scratching due to the abrading of the window guard by the glass.

A solution that would allow the easy installation and replacement of inexpensive window shields, that would provide either a better seal between the existing window frame and the window shield or permit proper drainage of any trapped moisture that accumulates between the window shield and the window, and that would keep the window protector and window sufficiently apart to prevent a damaging interaction between the two, would be an improvement in the art and of great public value.

While quick change windows and window frames including window protectors are becoming available, the cost of retrofitting an entire vehicle with such devices is often very high. Therefore, a solution which would provide a less expensive method of retrofitting existing window frames to permit the use of quick change window shields would be an improvement in the art and of great public value.

SUMMARY OF THE INVENTION

The present invention provides a quick-change window protector useful for protecting the windows of buses, subways and other public transportation against vandalism. It comprises a traditional window shield made of a durable transparent material such as plexiglass and a specially designed mounting bracket which attaches to an existing window and window flame. The mounting bracket attaches to the window and window frame by an integral tab that fits between the existing window and its window seal. The mounting bracket is preferably made as an extrusion of a fairly rigid material such as aluminum or a thermoplastic. Preferably, the mounting bracket extends the entire circumference of the window and window seal. This can be accomplished either by mitering the mounting bracket at the corners of the window or by using a mounting bracket made of a material which is either flexible, or which can be made flexible, so that it can be bent around the window corners.

The mounting bracket is generally of a T-shaped cross section with first and second arms extending from a body section. The first arm of the T generally forms the tab for insertion between the window and the window seal. The second arm of the T together with the body section form a shoulder for receiving the outer edge of the window guard. The second arm holds the window guard spaced from the window so as to keep the window from abrading the surface of the window guard and thereby destroying its clarity. By spacing the window guard from the window, the buildup of condensation in the space between the window and the window guard is also reduced.

The body of the T includes a retaining channel for receiving a bead portion of a retaining seal. The retaining seal holds the window protector in place by pressing it snugly against the second arm of the T. The retaining seal is preferably made of an extruded elastomeric material.

In addition to providing the benefit of preventing abrasion of the window guard by the window and the buildup of condensation between the window and the window guard, the present invention permits the rapid replacement of a window guard. In order to replace a window guard of the present invention, the retaining seal is first removed with a conventional window seal removal tool and the original window guard is pulled outwardly from the mounting bracket. Then, a new window guard is set on the shoulder of the mounting bracket and either a new retaining seal or the existing retaining seal is set in place within the channel of the mounting bracket.

The initial installation of the mounting bracket is also fast and simple. Preferably a length of an extruded mounting bracket is pressed into place by pressing the tab formed by the first arm of the T section between the existing window and window frame. The installer works around the window frame pressing the tab into place a section at a time. In the preferred embodiment, the mounting bracket extrusion, while being sufficiently rigid to firmly anchor the window guard, has some degree of malleability or flexibility to permit it to be bent around the corners of a window having generally rounded corners. If the window has square corners a single length of mounting bracket extrusion can be used which is mitered to extend around the corners, or four separate lengths of mounting bracket extrusion can be installed one on each of the four sides of the window.

It is important to note that the mounting bracket for the window shield of the present invention requires no drilling or alterations to either the existing window or window frame. The mounting bracket is merely pressed in place using a suitable tool to press against the shoulder of the mounting bracket, thereby seating it firmly between the window and window frame.

DETAILED DESCRIPTION OF THE INVENTION

The present invention is directed to a window protector system including a window guard and mounting bracket for mounting the window guard to an existing window and window frame. The present invention further permits the rapid replacement of a damaged window guard.

Figure 1:
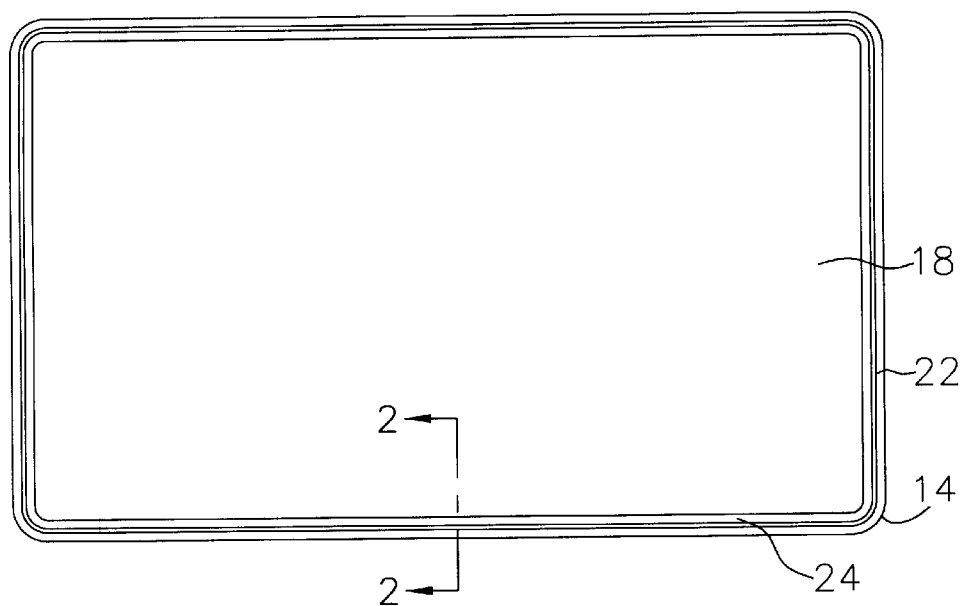
FIG. 1 is an elevation view of a typical bus or subway window with one embodiment of the present invention installed.
Figure 2:
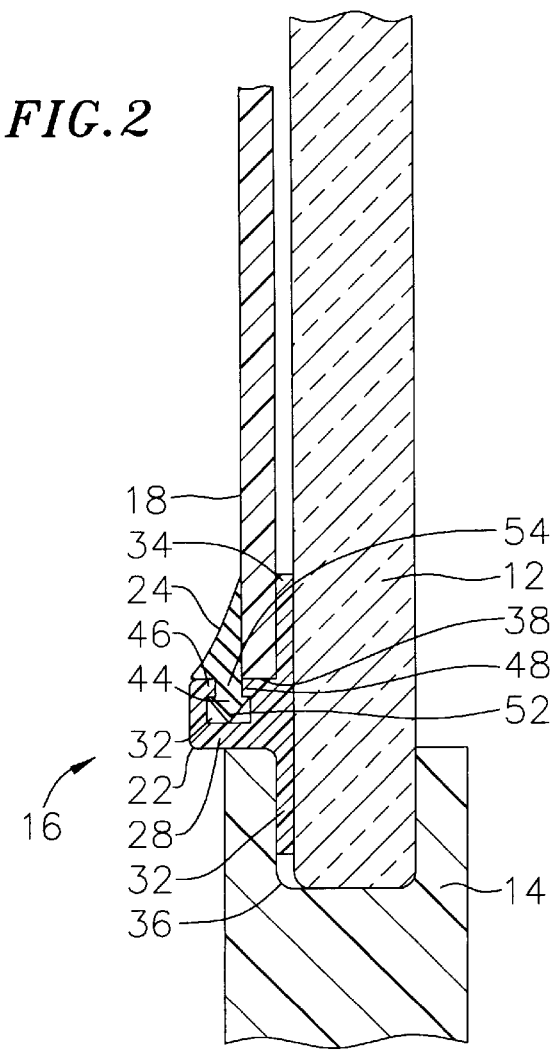
FIG. 2 is an enlarged cross section view of the device of FIG. 1 taken along the line 2—2.

Referring to FIGS. 1 and 2, a generally rectangular bus window 12 and window frame 14 are illustrated with the window protector 16 of the present invention installed. The window protector includes a window shield 18, a mounting bracket 22, and a retaining seal 24.

As is best illustrated in FIG. 2, the mounting bracket has a generally T-shaped cross section with a body section 28 form which extend first and second arms 32 and 34. The first arm acts as a continuous tab which is inserted into the channel 36 formed by the existing window frame 14 so as to be frictionally held in place between the existing window 12 and the window frame. The second arm and the body together form a seat 38 upon which the window shield 18 rests. The second arm holds the window shield spaced from the existing window to create an air space which helps to prevent the window and window shield from rubbing against one another and to prevent the buildup of condensation between the window and window shield. The second arm and body form an inwardly facing shoulder defining a seat.

The body of the mounting bracket also includes a C-shaped channel 42 facing inwardly from the window frame. The channel receives a bead portion 44 of the retaining seal 24 to hold the retaining seal against the window shield. The C-shape of the channel is formed by a pair of opposing lips 46 and 48 which neck down the opening of the channel to better grip the bead of the retaining seal. In the preferred embodiment, the bead of the retaining seal is preferably of an arrowhead cross section with a pointed end 52 and a neck 54. This configuration simplifies the insertion of the bead into the channel as will be described in further detail below.

While in the preferred embodiment, the mounting bracket includes a first tab for insertion between the existing window and window frame that is continuous along the entire length of the mounting bracket, as an alternative, intermittent tabs could be provided. Similarly, intermittent second arms can be provided to hold the window protector spaced from the window. Intermittent channels can also be provided for receiving shorter sections of retaining seals. In yet another embodiment, an intermittent channel can be provided for use with a continuous retaining seal with intermittently spaced bead sections to cooperate with the intermittent channel. In still another embodiment, short sections of mounting brackets as described above can be placed at a number of locations around the perimeter of the window frame. However, in the preferred embodiment, the mounting bracket is formed in a continuous length by an extrusion process. Such a mounting bracket includes, a continuous tab in the form of the first arm of the T-shaped cross section, a continuous second arm and a continuous channel. The use of such a mounting bracket provides a particularly neat looking, durable and reliable means for attaching the window shield to the window frame. Such a mounting bracket further helps to effectively seal the window shield and prevent moisture from collecting in the space between the window shield and the window. However, in some applications, the use of spaced sections of mounting bracket can be useful it that such a configuration permits the drainage of any water that collects between the window shield and the window.

The mounting bracket of the present invention is easily installed to an existing window and window frame assembly. In the preferred embodiment, a continuous length of extruded mounting bracket is used for the entire window. Starting at any point around the circumference of the window, the first arm of the mounting bracket is pressed into the window frame channel between the window and window frame. In one embodiments the first arm of the mounting bracket has a wedge-shaped tip which can simplify its installation between the window and window frame.

A tool such as a bladed screwdriver or putty knife is useful for installation in that the blade of either tool can be pressed against the seat of the mounting bracket to press the first arm into place. This process is repeated along the length of one side of the window. If the extruded mounting bracket is of a malleable material such as aluminum, and if the window has rounded corners, the mounting bracket can be bent to travel around the corners. The bending of such a mounting bracket is preferably done with an aluminum bending tool. The bent mounting bracket is then pressed into place and the installation process is repeated until the mounting bracket has been installed around the entire circumference of the window. If the extruded mounting bracket is made of a thermoplastic material, then the mounting bracket may need to be heated somewhat to permit it to be bent around a corner.

If the window has square corners, or rounded corners of a radius too tight to permit an extruded mounting bracket to be bent around the corners, then the mounting bracket can be installed in four sections on the four sides of the window. As yet another alternative, a continuous length of extruded mounting bracket can be trimmed with a slit in the first arm at the corner and a mitered joint or notch can be cut in the second arm at the corner so that the body of the mounting bracket can be bent around the corner.

Once the mounting bracket is in place around the entire circumference of the window, a window shield is cut to the proper size and shape from a sheet of an appropriate material, preferably a durable transparent material such as acrylic or polycarbonate. While the window shield is illustrated with its perimeter butting against the seat of the mounting bracket, the window shield can also be cut slightly smaller than the size defined by the seat of the mounting bracket so as to simplify its insertion into the mounting bracket. Because the mounting bracket has no protrusions extending into the opening defined by the seat of the mounting bracket, the window shield is easily placed on the seat of the mounting bracket by pressing it directly into place.

Once the window shield has been seated in the mounting bracket, the retaining seal is used to hold the window shield in place. The retaining seal is secured to the mounting bracket by its bead which mates with the channel of the mounting bracket. The retaining seal is installed with a tool such as a bladed screwdriver or putty knife in a fashion similar to that used for the installation of the mounting bracket.

The retaining seal is preferably made of an extrusion of an elastomeric material. In the preferred embodiment, the retaining seal is made of a thermoplastic elastomer sold by Advanced Elastomer Systems, LP of Akron, Ohio under the trademark SANTOPRENE.

As pointed out above, it is also preferred that the bead of the retaining seal be of an arrow-shaped cross section. The pointed tip of such a bead is useful in guiding the bead into the channel. The neck portion of the seal is useful in locking the retaining seal to the channel in that the neck defines a pair of barbs in the retaining seal which are firmly gripped within the C-shaped channel.

Once installed, the window protector of the present invention protects the existing window from damage such as might occur due to acts of vandalism. If the window is vandalized, the window shield will bear the brunt of damage. Once a window shield has been damaged to the point where it is desirable to replace it, it can easily be replaced in a short period of time. First, the retaining seal is removed. This can be done using a standard windshield installation tool which is essentially a screwdriver with a hook at its bladed end. Then, the damaged window shield is removed and discarded. A new window shield is placed on the seat of the mounting bracket and either the previously used retaining seal or a new retaining seal is installed as set forth above to hold the new window shield in place.

The embodiments described above are only some of the possible embodiments of the present invention. The invention would work equally well for windows of various shapes (round, triangular, square, etc.). The invention, while useful for protecting a window, could also be used on any number of different surfaces which are to be protected against the elements of weather in addition to or instead of vandalism. For example, a protective shield according to this invention can be installed on some other framed panel in order to protect the framed panel from damage or exposure. Similarly, the mounting arrangement, as described, may be used in other contexts. For example, many buses carry advertising placards mounted over panels mounted in frames secured to the outside of the bus. The present invention may be used with a stiff paper or plastic placard shield used in place of the graffiti shield to mount over such a panel.

I claim:

1. A window and window protector combination, the window including a plate of window material held in place within a window frame, the window protector comprising:
    a window shield;
    a mounting bracket comprising:
        a tab inserted in between the plate of window material and the window frame;
        a shoulder facing inwardly from the window frame and defining a seat which receives the window shield in spaced relation to the window material; and
    a retaining seal removably attached to the mounting bracket and adjacent the window shield, the retaining seal holding the window shield against the shoulder, wherein when the retaining seal is removed, the window shield may be removed from the mounting bracket without removal of the mounting bracket.

2. A combination according to claim 1 wherein the shoulder includes a channel for removably holding the retaining seal to the mounting bracket.

3. A combination according to claim 1 wherein the mounting bracket has a generally T-shaped cross section comprising a body and first and second arms wherein the first arm forms the tab and the body and second arm define the shoulder.

4. A combination according to claim 3 wherein the shoulder includes a channel for removably receiving the retaining seal.

5. A combination according to claim 1 wherein a single mounting bracket is provided which extends circumferentially around the entire window frame.

6. A combination according to claim 1 wherein the window is of a generally rectangular shape having four sides and the mounting bracket is provided in four sections, one on each of the four sides of the generally rectangular window.

7. A combination according to claim 1 wherein the window has generally rounded corners and the mounting bracket is provided in a single length bent to accommodate the generally rounded corners.

8. A combination according to claim 1 wherein the mounting bracket is an extrusion of aluminum.

9. A combination according to claim 1 wherein the mounting bracket is an extrusion of polymeric material.

10. A combination according to claim 1 wherein the retaining seal is an extrusion of elastomeric material.

11. A combination according to claim 10 wherein the shoulder of the mounting bracket includes a channel for removably receiving the retaining seal and the retaining seal includes a bead for removably anchoring the retaining seal to the channel.

12. A combination according to claim 1 wherein the tab is frictionally held in place down between the plate of window material and the window frame.

13. A combination according to claim 1 wherein the tab is held down between the plate of window material and the window frame without attachment means.

14. A panel, frame and shield combination comprising:

a panel;

a frame for holding the panel;

a sheet of shield material;

a mounting bracket strip having a T-shaped cross section defined by a body and first and second arms, the first arm inserted in between the panel and the frame, and the second arm and body forming an inwardly facing shoulder defining a seat which receives the sheet of shield material in spaced relation to the panel; and a retaining seal removable attached to the mounting bracket and adjacent the shield material, the retaining seal holding the shield material against the shoulder, wherein when the retaining seal is removed, the shield material may be removed from the mounting bracket without removal of the mounting bracket.

15. A combination according to claim 14 wherein the mounting bracket is an extrusion of a deformable material.

16. A combination according to claim 15 wherein the deformable material is aluminum.

17. A combination according to claim 15 wherein the deformable material is a thermoplastic material.

18. A combination according to claim 15 wherein the panel has generally rounded corners and the mounting bracket is provided in a single length that can be bent to accommodate the generally rounded corners.

19. A combination according to claim 14 wherein the panel has generally rounded corners and the mounting bracket is provided in a single length that can be bent to accommodate the generally rounded corners.

20. A combination according to claim 14 wherein the retaining seal is an extrusion of elastomeric material.

21. A combination according to claim 14 wherein the shoulder of the mounting bracket includes a channel for removably receiving the retaining seal and the retaining seal includes a bead for removably anchoring the retaining seal to the channel.

22. A combination according to claim 14 wherein the first arm is frictionally held in place down between the panel and the frame.

23. A combination according to claim 14 wherein the first arm is held down between the panel and the frame without attachment means.

* * * * *